United States Patent [19]
Rosenbald

[11] 3,802,672
[45] Apr. 9, 1974

[54] INTEGRAL DIRECT CONTACT CONDENSERS AND BLOW HEAT RECOVERY PROCESS

[75] Inventor: Axel E. Rosenbald, Rocky Hill, N.J.

[73] Assignee: The Rosenblad Corporation, Princeton, N.J.

[22] Filed: Feb. 23, 1972

[21] Appl. No.: 228,628

[52] U.S. Cl......... 261/36 R, 261/113, 261/DIG. 10, 261/DIG. 32, 261/DIG. 44
[51] Int. Cl................................................. B01f 3/04
[58] Field of Search.... 261/DIG. 10, DIG. 32, 36 R, 261/29, DIG. 44, 113

[56] References Cited
UNITED STATES PATENTS

| | | | |
|---|---|---|---|
| 1,010,044 | 11/1911 | Grace | 261/113 |
| 1,028,157 | 6/1912 | Trinks | 261/113 |
| 1,929,410 | 10/1933 | Coey | 261/29 |
| 1,987,097 | 1/1935 | Coubrough | 261/113 |
| 2,223,237 | 11/1940 | Cooke | 261/DIG. 10 |
| 2,889,004 | 6/1959 | Nutting et al. | 261/113 X |
| 3,480,025 | 11/1965 | Hsu et al. | 261/36 R |
| 2,599,139 | 6/1952 | Stevenson | 261/36 R |
| 884,610 | 4/1908 | Rateau | 261/36 R |
| 1,061,573 | 5/1913 | Stevens | 261/113 |
| 2,558,222 | 6/1951 | Parkinson | 261/113 |

*Primary Examiner*—Tim R. Miles
*Attorney, Agent, or Firm*—Brooks Haidt & Haffner

[57] ABSTRACT

An integral condenser utilizes the entire cross sectional area of an accumulator to condense all of the blow steam from batch digesters. Concentric weirs of diminishing diameters cause water circulated from the bottom of an accumulator tank to cascade down, forming a curtain of falling water around the periphery of the accumulator tank near its top. Blow steam introduced through the water curtain is effectively condensed. The water distribution and circulation system insures the passage of the steam through a uniform water curtain regardless of water flow, while the water in the accumulator remains as hot as possible, and just the right amount of water needed to condense the steam contacts the steam.

10 Claims, 4 Drawing Figures

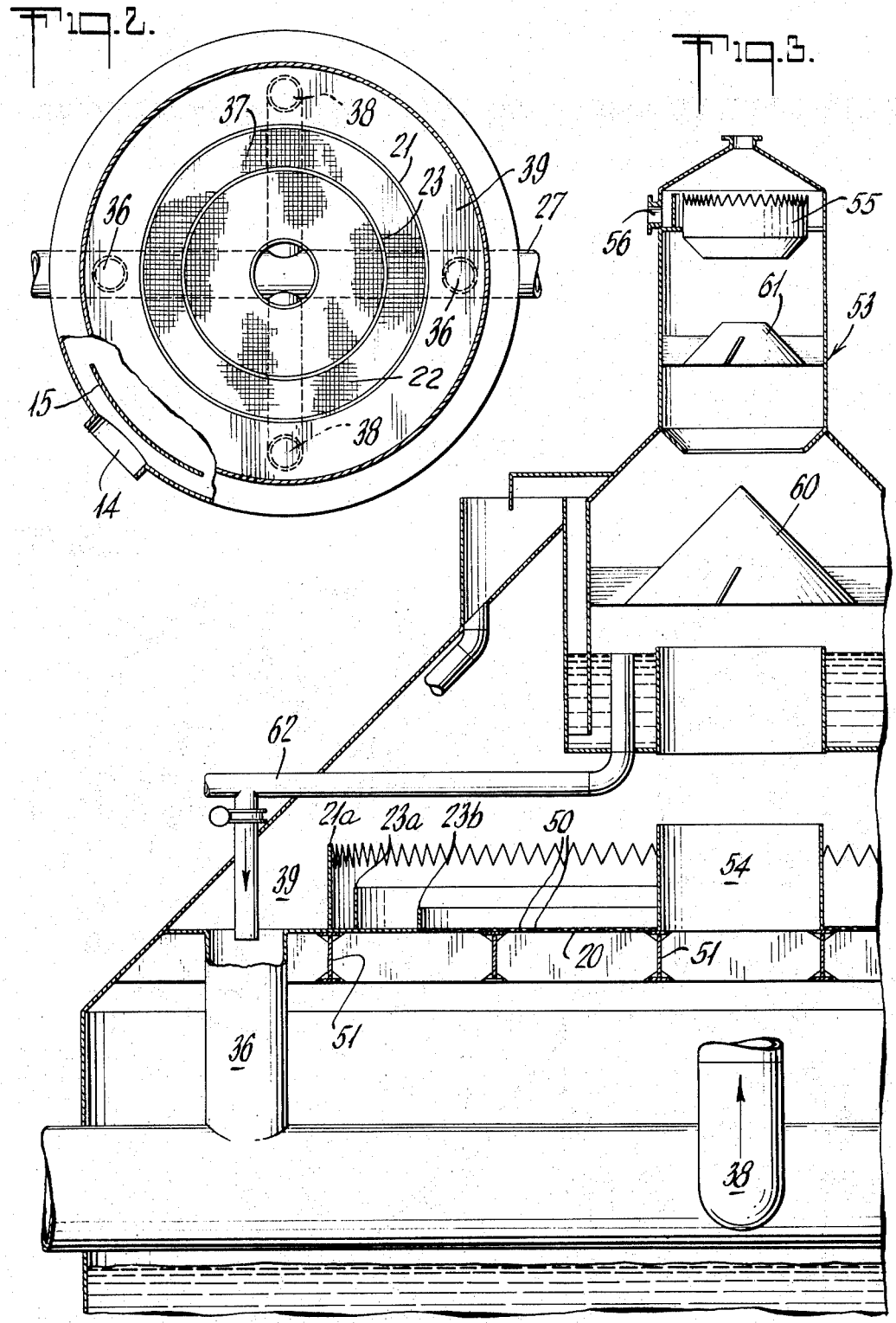

INTEGRAL DIRECT CONTACT CONDENSERS AND BLOW HEAT RECOVERY PROCESS

BACKGROUND OF THE INVENTION

1. Field of the Invention

The present invention relates to the recovery of heat from steam and, more particularly, to a system for recovery of heat released by the glow of digesters in pulp processing.

2. Description of the Prior Art

During the process of cooking wood pulp or the like, a large amount of heat is added to the system and a high pressure is established. When the cooking is completed the digester is "blown" and a large quantity of steam is released. At one time the blow steam was released to the atmosphere, but the undesirable effects on the environment and the waste of heat energy have made this highly undesirable.

Various prior art systems exist for the recovery of steam flashed off during digester blows and using the steam to heat water. The two basic prior art systems are the surface condenser and the jet, or direct-contact condenser. A jet condenser is shown in U.S. Pat. No. 2,329,727.

In both of these prior art arrangements the condenser system has been a separate unit from the accumulator in which the hot water is stored. A serious problem has been caused by the fact that the rate of flow of steam to a condenser varies greatly and the condenser must be sufficiently large to handle several digesters which are blown simultaneously, and the peak rate of heat release is much greater than an average rate. All of the blow steam must be condensed and the water in the accumulator tank should be kept as hot as possible. The regulation of prior art condenser arrangements to achieve these goals has presented problems. Both types of prior art condenser arrangements are costly in capital investment as well as in operating power requirements.

SUMMARY OF THE INVENTION

The present invention provides an integral system for the condensation of steam blown from digesters in which blow steam passes through a curtain of water in the accumulator tank itself, utilizing the entire cross-sectional area of the tank for maximum surface exposure between cooling water and the steam.

Blow steam is introduced into the upper portion of the accumulator tank itself, and is deflected to flow around the tank periphery near the top of the tank. Cooling water pumped from the bottom of the accumulator tank is distributed to a perforated plate located a suitable distance above the surface of the water in the tank and above the point at which the blow steam is introduced. A system of concentric weirs controls the distribution of the water to the perforated plate, so that regardless of the water flow, the blow steam must pass through a uniform water curtain. Because of the flow arrangement, the rate of flow of circulated water may be closely controlled to correspond to the amount needed to condense the blow steam.

It is accordingly an object of the invention to provide a blow heat condensing arrangement which will effectively condense all of the blow steam from pulp digestion while keeping water in an accumulator tank as hot as possible.

Another object of the invention is to provide an integral blow heat condenser arrangement having a high turndown ratio for efficient condensing of steam regardless of variations in the input of steam to the condenser.

A further object is to provide a blow heat condenser system permitting a very accurate control of water flow.

Yet another object is to provide an arrangement for condensing blow steam which has minimum operating power requirements.

These and other objects and advantages of the system of the invention will be more fully appreciated from the following detailed description taken in conjunction with the accompanying drawing.

BRIEF DESCRIPTION OF THE DRAWING

FIG. 2 is a top view of the system of FIG. 1, partially in section, and with internal structure shown by shadow lines.

FIG. 3 is a detail view, in section, of a system similar to that of FIG. 1.

DESCRIPTION OF PREFERRED EMBODIMENT

Figure 1:
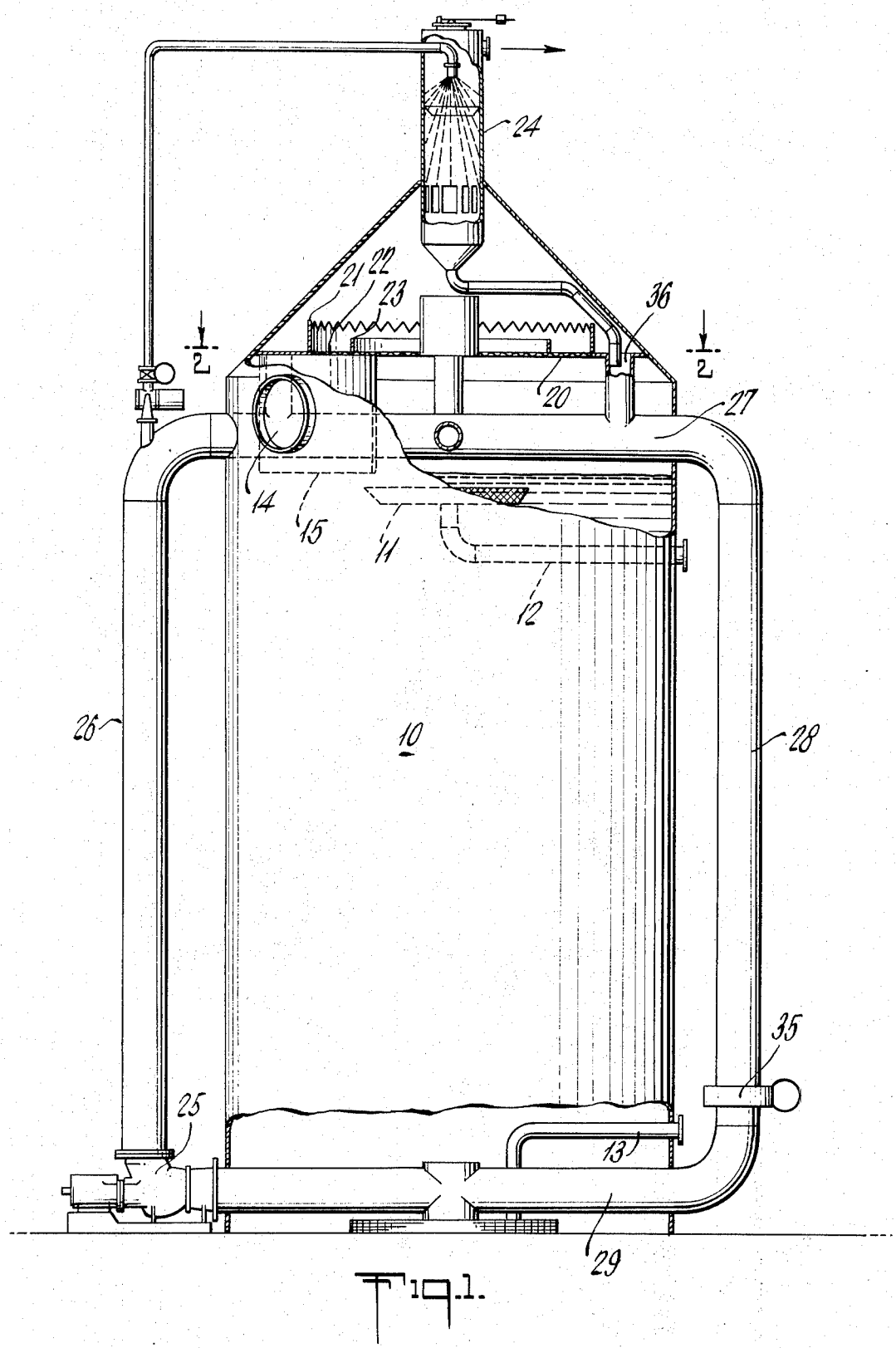
FIG. 1 is a side view of a system according to the invention, partially in section, and with some internal structure shown by shadow lines.

In FIG. 1 of the drawing, a generally cylindrical accumulator tank 10 is shown equipped with an integral blow heat condensing system according to the invention. The accumulator tank 10 is generally similar to the accumulator tank shown in U.S. Pat. No. 2,329,727, and serves as a container for heated water with hotter water near the top. A draining device 11 comprising generally conical funnel is situated in the upper part of the accumulator tank 10 for removal of heated water from the accumulator through a pipe 12 for heat exchange and recovery. Cool water, usually water from which heat has been recovered, is fed to the lower part of the accumulator through the conduit 13. The water level in the accumulator tank is indicated in the drawing as somewhat higher than the draining device 11. It will be understood that water near the bottom of the accumulator tank 10 is considerably cooler than water at the upper levels, though even at the lower levels, the water may have a temperature above 100°F.

An inlet 14 for blow steam into the accumulator tank 10 is located above the surface of the collected water as shown in FIGS. 1 and 2. The inlet 14 is sufficiently large to allow entry of the large quantities of steam released upon blowing of one or more digesters. A baffle, shown as a curved plate 15, is positioned inwardly of the inlet 14 to direct the steam to flow around the inside periphery of the accumulator tank 10.

The generally conical top or head on the accumulator tank 10, just above the steam inlet 14, contains a perforate horizontally disposed plate 20, which is circular in plan, and which serves to distribute cooling water for condensing the blow steam entering through the inlet 14. This plate 20 is positioned a suitable distance above the optimum water level in the accumulator tank 10, usually at a distance of at least several feet above the water level in a typical application.

In accordance with an important feature of the invention, water flows to the perforated plate 20 over at least one upstanding sawtooth weir 21, concentrically mounted on the plate 20. FIG. 1 shows a relatively high weir 21 disposed near the the periphery of the plate 20 and encircling the perforated central portion 22 of the plate 20. Radially outwardly of the weir 21, the plate 20 is not perforated. A secondary, smaller weir 23 is also shown in FIG. 1 concentrically mounted radially inwardly of the weir 21 on the plate 20. Additional concentric weirs might be provided, the relative heights of the weirs decreasing toward the center of the plate 20. The weirs insure that entering blow steam passes through a uniform curtain of cooling water regardless of water flow. The thickness of the water curtain will vary with water flow and the locations of the weirs in a manner to be described.

The condenser system is vented at its center, as shown by the arrow in FIG. 1, and may suitably be equipped with a simple after condenser 24 as shown in the drawing.

Cool water circulates in what is basically a closed loop. A continuously operating pump 25 forces cool water up the large vertical pipe section 26 located outside the accumulator tank 10. From the top of the pipe section 26 the cool water flows horizontally through the pipe section 27 which passes diametrically through the tank 10 above the water level. After passing through the pipe section 27 the water returns to the pump 25 by way of the pipe section 28 outside the accumulator 10 and the horizontal pipe section 29 which passes through the bottom of the accumulator tank 10.

The pump 25 may be suitably of the propellor type, but other types of pumps might also be used. The pump must be capable of continuous operation and powerful enough to keep a large volume of water in circulation.

A control valve 35 is shown located in the pipe section 28 for controlling the return flow of the water to the pump 25. The pump 25 and pipe system are of such size and capacity that no water backs up to flow over the weir 21 when the control valve 35 is fully open, but when the control valve is partially or fully closed, and the return flow of water to the pump 25 is throttled, water backs up and flows over weir 21.

The flow of water over the weir 21 upon operation of the valve 35 will be best understood by consideration of FIGS. 1 and 2. The horizontal pipe section 27 communicates with two vertically extending conduits 36 which lead water through the plate 20 at its outer imperforate area, that is, radially outside of the weir 21. A pair of transversely extending pipes 37 with upwardly extending conduits 38 at their outer ends may also be provided as best shown in FIG. 2, to carry water to the plate 20 at locations arcuately equally spaced between the conduits 36.

Upon closing of the valve 35, the circulating water backs up, rises through the conduits 36 and 38 and fills an annular space 39 outside the weir 21 to overflowing. The water flows over the weir 21 and then down through the holes in the plate 20 to form a curtain of cooling water, through which the blow steam must pass. It has been found that a sawtooth configuration of a weir's upper edge promotes even flow over the weir. If the water flows at such a rate that it cannot all pass immediately through the plate perforations between the weir 21 and the inner weir 23, the water will accumulate and then overflow the weir 23 to flow through the perforations of the inner portion of the plate 20, thus forming a thicker curtain of water falling downward into the accumulated water in the tank 10. The thicker curtain of water so produced would serve to cool a greater volume of blow steam. Any suitable number of concentric weirs can be provided.

It will be seen that the system of the invention lends itself to very accurate regulation of the flow of cooling water in response to the flow of steam to be condensed. The pump 25 operates at a rate above the maximum design steam flow at all times, so there is no lag in the delivery of water to form the cooling water curtain. Immediately upon closing down of the valve 35 there is a flow of water over the weir 21 to contact the blow steam. Just the right amount of water needed to condense the blow steam can be promptly delivered as a water curtain. Between blows, the bypass loop formed by the pipes 26–29 and pump 35 keeps water circulating at a steady rate without any flow over the weirs 21, 23, etc., so the water in the accumulator tank 10 is not disturbed. This keeps the accumulated water near the surface as hot as possible.

The condenser discharges its cooling water during a digester blow in such a way as to cause minimum disturbance of the liquid level in the accumulator 10. This is important because the water at the bottom of the tank 10 is cooler than at the top and mixing of the water would negate the function of the accumulator.

The system has a very high turndown ratio, that is, whether the system is operated at its maximum flow rate or at its minimum flow rate the effieiency is not substantially effected. The power requirements of the system are minimal. Compared with the current technology, in which the total head requirements for pumps which pump cold condensate are very high, there is at least a 50 percent saving of power involved in the pumping arrangement of the invention.

The system of the invention has been generally discussed in connection with FIGS. 1 and 2. Some specific advantageous details may be seen in FIG. 3, which illustrates an embodiment in which three concentric weirs 21a, 23a, and 23b are provided. It will be seen that the outer, primary, weir 21 is considerably higher than the weir 23b. The spacing of the weirs is such that if water flows at a sufficient rate to overflow the weir 21a but not the weir 23a, a relatively thin water curtain falls through perforations in the plate 20. If the flow rate of the water is sufficient to overflow the weir 23a also, but not the weir 23b, the water curtain is more than twice as thick; and if the water flows at so great a rate as to overflow even the innermost weir 23b, a very heavy curtain of water falls down into the tank 10. It has been found that if the plate 20 has uniformly distributed ½ inch diameter holes spaced on a 2 inch square pitch, a very effective flow of cooling water results. Of course these dimensions are merely illustrative and the specific hole sizes and pitch would be best determined in accordance with the actual application.

Reinforcing beams 51 for the plate 20 are also shown in FIG. 3. Since a large quantity of water passes over the plate, sturdy reinforcements should be provided. This is also true for the other embodiments of the invention, although the reinforcements are not shown in all of the figures for the sake of clarity. The reinforcing beams 51 are so dimensioned and positioned that their presence does not interfere with the flow of water through the holes 50.

FIG. 3 also illustrates an after condenser arrangement generally indicated by the reference numeral 53. Steam which has passed uncondensed through the water curtain as described below will pass upwardly through the central conduit 54 at the middle of the plate 20. Since no steam should be vented to the ambient in order to minimize air pollution, such uncondensed steam can effectively again be contacted with cooling water for complete condensation. In the embodiment of FIG. 3, and after condenser weir 55 affords an even overflow of water pumped to the after condenser through a water inlet 56. Water passing over the weir 55 will contact any remaining uncondensed steam flowing upwardly past central baffles 60 and 61, and the cooling water and condensate are returned to the accumulator 10 by a piping system 62 as shown.

Figure 4:
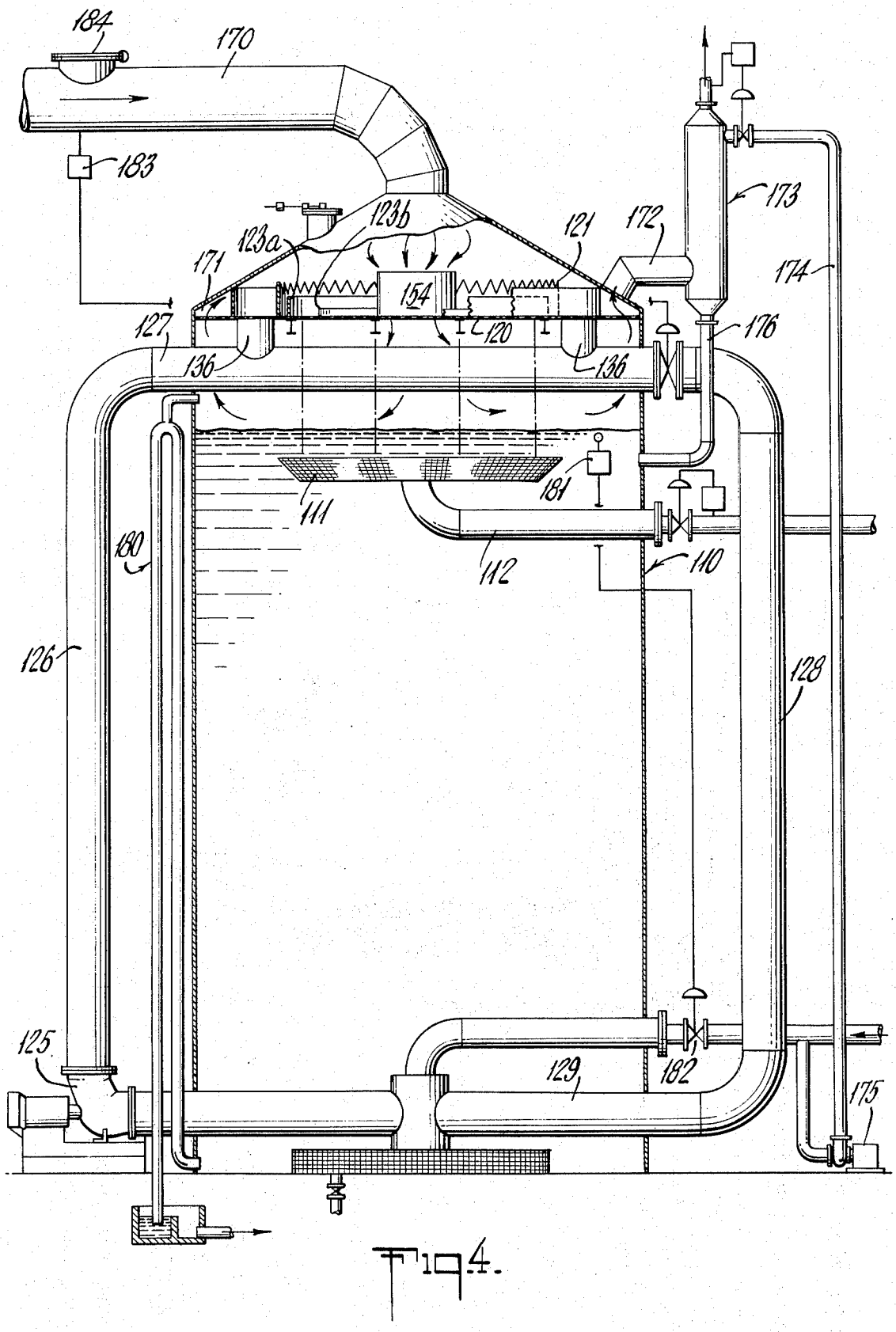
FIG. 4 is an overall view, in section, of a system according to a modification of the invention.

FIG. 4 shows another embodiment of the condensing system of the invention, and also illustrates automatic controls which are also suitable for the several embodiments already described. The embodiment of FIG. 4 has an accumulator 110 similar to the accumulator tank 10 of FIGS. 1–3, equipped with a draining device 111, a perforate plate 120, weirs 121, 123a, and 123b, a pump 125, a water circulation loop of pipes 126–129, etc. all similar to the elements shown in FIGS. 1–3 with reference numerals having their last two digits corresponding.

The embodiment of FIG. 4 differs from those of FIGS. 1–3 primarily in that blow steam enters at the top of the accumulator 110 through a conduit 170. The entering steam travels down through a central conduit 154 and passes outwardly through a curtain of cooling water provided as previously described. The direction of steam flow is indicated by arrows. An annular chamber 171 is provided outwardly the periphery of the plate 120 for the passage of any uncondensed steam. A conduit 172 communicates with the chamber 171 to carry steam to a secondary condenser 173, fed with cool water through a pipe 174 by means of a pump 175. Condensate is returned to the accumulator through the pipe 176.

In addition to the features just described, FIG. 4 shows certain elements which can be suitably included in the embodiments of FIGS. 1–3. Thus an overflow arrangement 180 is illustrated for carrying off to a sewer any excess accumulated water from the tank 110. A liquid level sensing device 181, connected to a valve 182, controls the input of cool water to the system by throttling the valve 182 when the liquid level in the tank rises too high. A pressure relief control 183 is shown for relieving excessive pressure of incoming blow steam by way of a vent 184.

Numerous modifications within the spirit and scope of the present invention will suggest themselves to those familiar with heat exchange and heat recovery systems.

I claim:

1. An integral direct contact heat recovery system comprising an accumulator, a space near the top of the accumulator for contacting steam with cooling water for condensing the steam, means for admitting steam to said space, a head portion on said accumulator comprising means for evenly distributing cooling water for contacting said steam, means for circulating cooling water in a loop between the bottom and the top of the accumulator, and means for supplying water from said loop to said distributing means.

2. The system of claim 1 wherein said distributing means includes a perforated plate and weir means on said plate for controlling the flow of water to perforations in the plate for causing a uniform curtain of water to be formed by the flow of water through the perforations.

3. The system of claim 2 wherein said plate is circular in plan, and said weir means includes at least one sawtooth weir located near the periphery of said plate.

4. The system of claim 2 wherein the means for admitting steam to said space includes an inlet formed in said accumulator and said plate is located above said inlet.

5. The system of claim 2 wherein the means for admitting steam to said space includes a conduit leading to the head portion, said conduit opening above said perforated plate.

6. The system of claim 2 wherein said weir means is near the periphery of the plate, separating a perforated central portion of the plate from an imperforate peripheral area of the plate, and said means for supplying water supplies water to said peripheral area, whereby cooling water must overflow said weir means to reach the perforations of said central portion.

7. The arrangement of claim 6 wherein said weir means comprises an upstanding primary annular sawtooth weir, and including at least one smaller secondary weir positioned concentrically inward of said primary weir on said plate.

8. A method for condensing blow steam from digesters comprising: passing said blow steam directly into contact with a curtain of falling water for condensing said steam; and controlling the flow of water to said curtain so that the quantity of water contacting the steam is just sufficient to condense the steam by constantly circulating cooling water in a normally closed loop from bottom to top of an accumulated supply of water, and withdrawing a flow of water from the water circulating in said loop upon the admission of said blow steam, passing said withdrawn water over at least one weir to form said water curtain, and controlling the thickness of the water curtain by regulating the rate of withdrawal of water from the circulating water in said loop, the number of weirs over which the withdrawn water flows determining the thickness of said water curtain.

9. The method of claim 8 wherein the withdrawal of water from the water circulating in said loop is achieved by throttling the flow of water circulating in said loop so that water backs up and exits to overflow said at least one weir.

10. The method of claim 9 wherein said curtain of water falls directly into said accumulated supply of water after contacting said steam whereby water condensed from said steam is directly added to said accumulated supply.

* * * * *